No. 741,106. PATENTED OCT. 13, 1903.
S. M. BURDICK.
FLEXIBLE SHAFT.
APPLICATION FILED APR. 27, 1903.
NO MODEL.

WITNESSES:
J. T. White
Pearl B. McMillan

Samuel M. Burdick
INVENTOR.
BY Claude L. McKesson
ATTORNEY

No. 741,106. Patented October 13, 1903.

UNITED STATES PATENT OFFICE.

SAMUEL M. BURDICK, OF COLORADO SPRINGS, COLORADO.

FLEXIBLE SHAFT.

SPECIFICATION forming part of Letters Patent No. 741,106, dated October 13, 1903.

Application filed April 27, 1903. Serial No. 154,551. (No model.)

*To all whom it may concern:*

Be it known that I, SAMUEL M. BURDICK, a citizen of the United States, residing at Colorado Springs, in the county of El Paso and State of Colorado, have invented certain new and useful Improvements in Flexible Shafts, of which the following is a specification.

My invention relates to certain new improvements in flexible shafts used for the transmission of power, and the objects of my improvements are to provide a power-shaft in which the maximum durability may be reached with a minimum expense, in which all the parts will be simple and readily interchangeable, and in which the friction will be as little as possible for any power-shaft.

I attain the objects of my invention by means of mechanism illustrated in the accompanying drawings, which are made a part of the specification.

Figure 1:
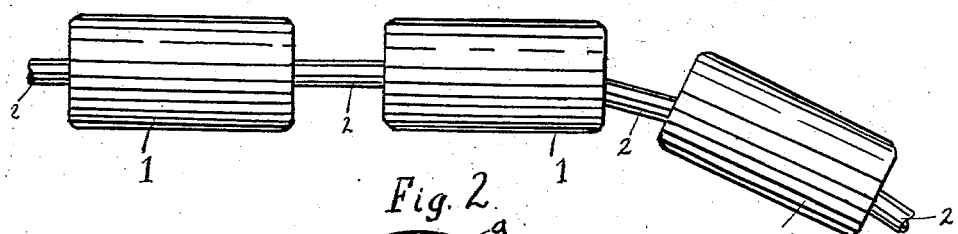
Figure 2:
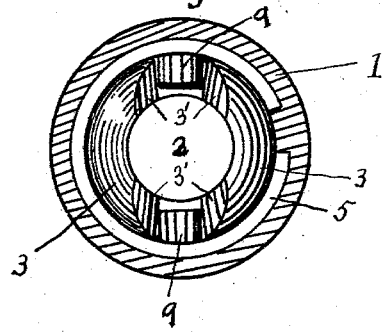
Figure 3:
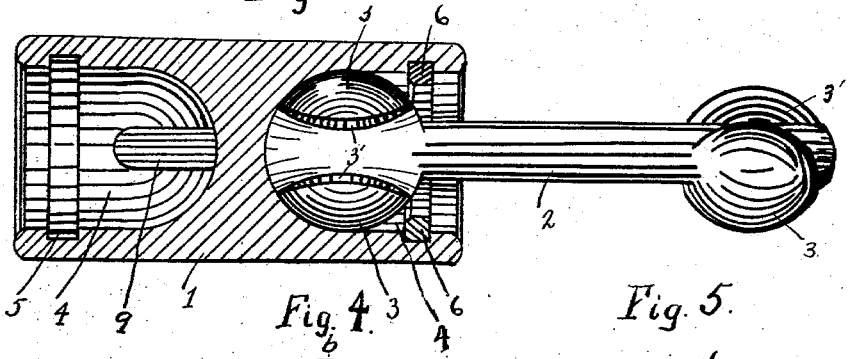
Figure 4:
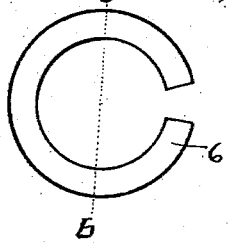
Figure 5:

Figure 1 is a view of the section of a flexible power-shaft consisting of three links. Fig. 2 is a sectional view of the end of one of the links of the shaft. This view shows the ball in the socket and the manner in which the ball is cut away to receive the shoulders in the socket. Fig. 3 is a vertical sectional view of one of the links, taken through the center from end to end, and serves to illustrate the interior construction of such link. Fig. 4 is a view of the spring collar or washer. Fig. 5 is a sectional view of the same, taken through the dotted line *b b*.

The principal parts of this device consist of the block 1, having in each end sockets 4 4, and the shafts 2 2. On each end of the shafts are balls 3 3, which are intended to operate in the sockets 4 4. These and the lesser parts form links, a series of which will constitute a flexible shaft of the desired length. In the sockets are the shoulders 9 9. Two grooves 3' 3' are cut on opposite sides of the ball 3, which grooves receive the shoulders 9 9. The grooves flare at the ends and are cut somewhat deeper than actually necessary for the reception of the shoulders. The flaring of the grooves permits the shaft 2 to move in a perpendicular direction, and the space between the shaft and the shoulders although small is sufficient to allow the shaft a horizontal motion. The power and flexibility of a flexible shaft depending entirely upon the freedom of movement which the various links will allow and as in this link there is the very smallest amount of friction, and as the only limit of the flexibility is the interior diameter, it will be seen that my invention accomplishes the desired purpose without danger of the "buckling" which is so common in flexible power-shafts. The ball is held in the socket by means of the spring-collar 6, which is placed around the shaft 2 and then pushed into block 1 and collar-seat 5. This collar is left open, as shown, and the seat is similarly constructed—that is, extends only the same distance around the block, so that the collar cannot slip or move when the shaft 2 bears against it. While the parts are few and simple, yet the end of the shaft while in position (shown in Fig. 3) may be moved in a complete circle without hindrance.

The parts of the shaft may be made of any size or length, and the construction which I have described is equally applicable to the shaft intended to drive a dentist-drill or one intended for power purposes in a power plant.

Having thus described my invention, what I claim as new, and desire to secure by Letters Patent, is—

In a flexible shaft, the combination of shaft and block members, said shafts having spherical ends with flaring channels therein, the blocks having a socket in each end provided with shoulders which engage in the channels of the spherical shaft ends, and with collar-seats, and split collars in said seats, substantially as described and for the purposes set forth.

In testimony whereof I have signed my name to this specification in the presence of two subscribing witnesses.

SAMUEL M. BURDICK.

Witnesses:
J. T. WHITE,
PEARL B. MCMILLAN.